United States Patent
Ge et al.

(10) Patent No.: US 7,925,466 B2
(45) Date of Patent: Apr. 12, 2011

(54) SPEED MEASURING SYSTEM AND SPEED MEASURING METHOD THEREOF

(75) Inventors: Chi-Sheng Ge, Taipei Hsien (TW);
Chen-Huang Fan, Taipei Hsien (TW);
Min-Wei Tseng, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 75 days.

(21) Appl. No.: 12/414,683

(22) Filed: Mar. 31, 2009

(65) Prior Publication Data

US 2010/0105333 A1      Apr. 29, 2010

(30) Foreign Application Priority Data

Oct. 23, 2008  (CN) .......................... 2008 1 0305099

(51) Int. Cl.
*G01P 3/00* (2006.01)
*G06F 19/00* (2006.01)

(52) U.S. Cl. ...................................... 702/142
(58) Field of Classification Search .................. 702/142
See application file for complete search history.

(56) References Cited

U.S. PATENT DOCUMENTS

| | | | | |
|---|---|---|---|---|
| 6,246,361 B1 * | 6/2001 | Weill et al. | ............... | 342/357.01 |
| 7,256,737 B2 * | 8/2007 | Hall et al. | ..................... | 342/387 |
| 2001/0052875 A1 * | 12/2001 | Kohno et al. | ................. | 342/417 |
| 2001/0053698 A1 * | 12/2001 | Karmi et al. | ................... | 455/456 |
| 2004/0067759 A1 * | 4/2004 | Spirito et al. | ............. | 455/456.1 |
| 2006/0027185 A1 * | 2/2006 | Troxler | ......................... | 119/721 |
| 2006/0052114 A1 * | 3/2006 | Cuffaro | ........................ | 455/456.1 |
| 2008/0071475 A1 * | 3/2008 | Takaoka | ........................ | 701/213 |
| 2008/0171515 A1 * | 7/2008 | Kim et al. | .................... | 455/63.1 |
| 2009/0096670 A1 * | 4/2009 | Mizuochi et al. | ........ | 342/357.12 |
| 2009/0098880 A1 * | 4/2009 | Lindquist | .................. | 455/456.1 |
| 2009/0189813 A1 * | 7/2009 | Haas et al. | ..................... | 342/384 |
| 2010/0066588 A1 * | 3/2010 | Chen | ............................. | 342/109 |

* cited by examiner

*Primary Examiner* — Cindy H Khuu
(74) *Attorney, Agent, or Firm* — Frank R. Niranjan

(57) ABSTRACT

A speed measuring system for measuring the speed of a wireless communication terminal communicating with a base station includes an angle measuring unit, a distance measuring unit, a time measuring unit, and a speed calculator. The base station includes a signal tower and an antenna on the signal tower. The signal tower defines a central longitudinal axis perpendicular to the antenna, and the axis intersects the antenna at a point. The angle measuring unit measures an included angle between signal from the wireless communication terminal at any location and the antenna. The distance measuring unit measures a distance between the wireless communication terminal at any location and the point. The time measuring unit measures the time the wireless communication terminal takes from a first location to a second location. The speed calculator calculates the speed of the wireless communication terminal.

13 Claims, 3 Drawing Sheets

SPEED MEASURING SYSTEM AND SPEED MEASURING METHOD THEREOF

BACKGROUND

1. Technical Field

The present disclosure relates to speed measurements and, particularly, to a speed measuring system using a communication network and a measuring method thereof.

2. Description of the Related Art

Some wireless communication terminals, such as cellular phones, include a global positioning system (GPS) for determining the geographical location of the wireless communication terminal. These wireless communication terminals, equipped with a GPS, can also be used to measure the speed of a moving object. However, equipping a wireless communication terminal with a GPS system increases the cost of the wireless communication terminal.

Therefore, what is needed is to provide a speed measuring system using a communication network and a measuring method thereof, which can overcome the above-mentioned problem.

DETAILED DESCRIPTION

Figure 1:
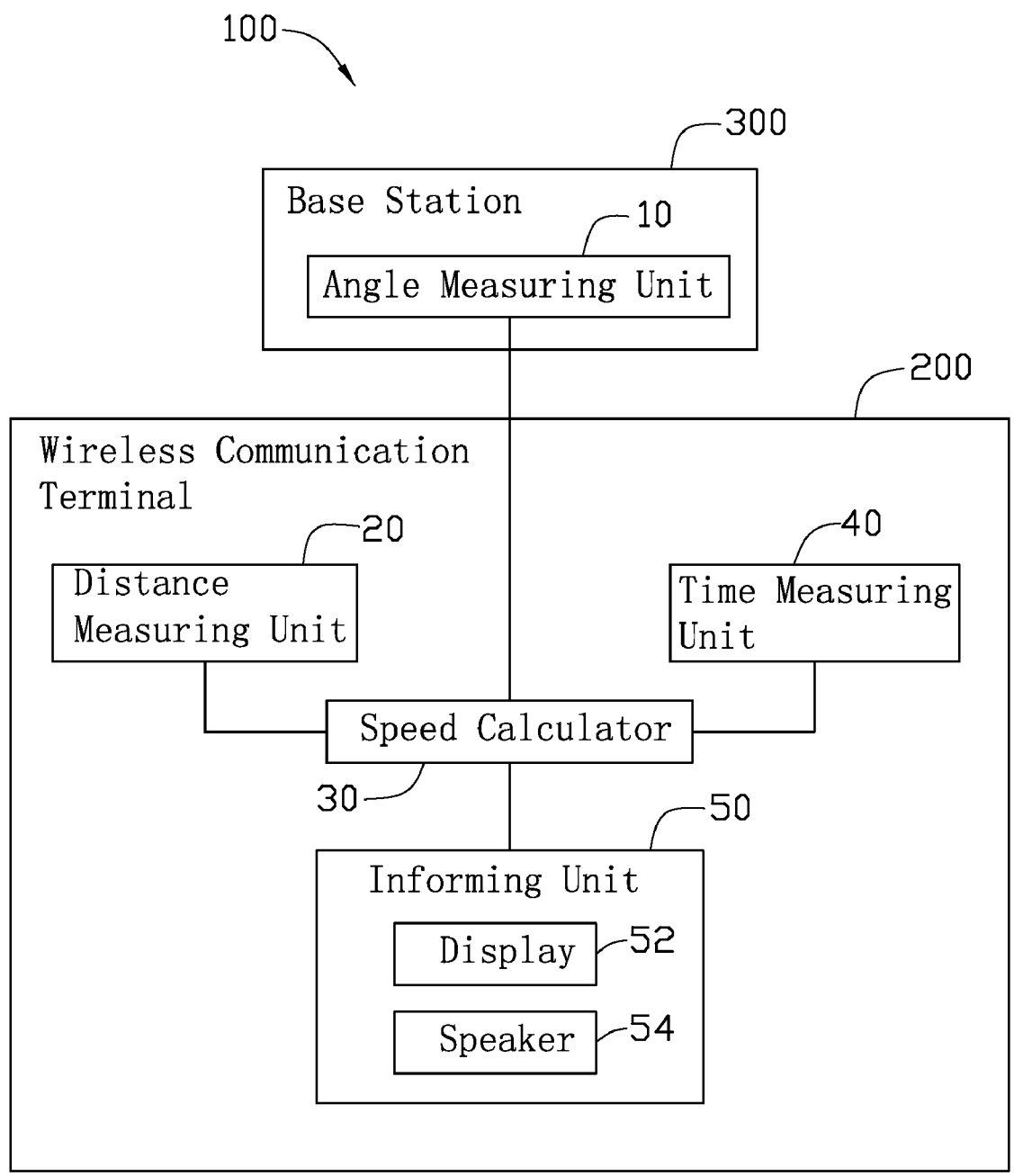
FIG. 1 is a functional block diagram of a speed measuring system, according to an exemplary embodiment.
Figure 2:
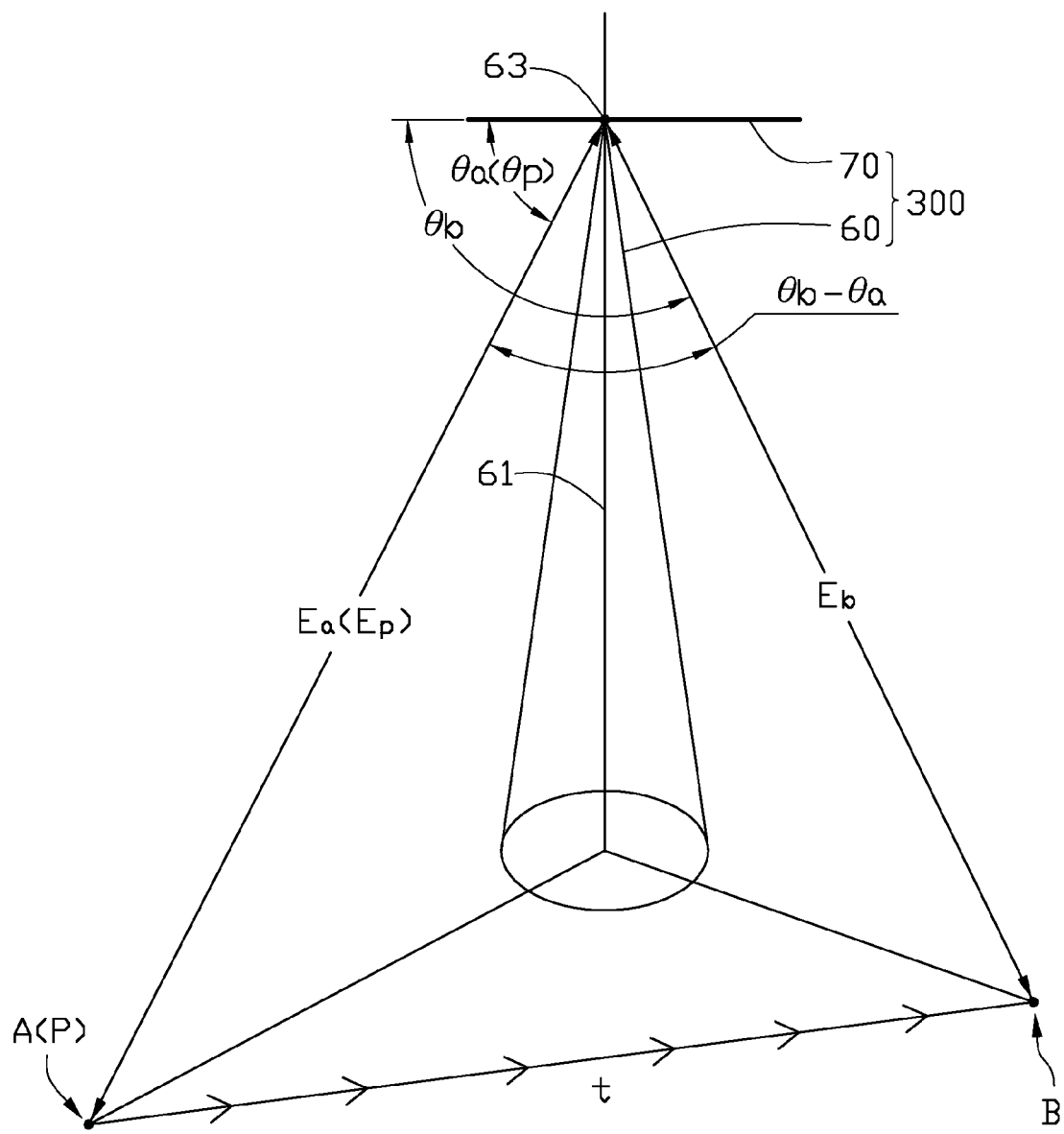
FIG. 2 is a schematic view showing a measuring principle of the speed measuring system of FIG. 1.

Referring to FIGS. 1 and 2, according to an exemplary embodiment, a speed measuring system 100 capable of measuring the speed of a moving object, using a communication network of base stations 300, is disclosed. The speed measuring system 100 includes an angle measuring unit 10, a distance measuring unit 20, a speed calculator 30, a time measuring unit 40, and an informing unit 50. The moving object may be a moving bicycle carrying a wireless communication terminal 200 on which the distance measuring unit 20, the speed calculator 30, the time measuring unit 40 and the informing unit 50 are installed and which is capable of communicating with a nearest base station 300 on which the angle measuring unit 10 is installed. For example, the communication network may be a global system for mobile communication (GSM) network, and the wireless communication terminal 200 may be a cellular phone. Each base station 300 includes a signal tower 60, and an antenna 70 configured in a horizontal plane on the signal tower 60. The signal tower 60 defines a central longitudinal axis 61 perpendicular to the antenna 70. The central longitudinal axis 61 intersects the antenna 70 at a point 63.

The angle measuring unit 10 is configured for measuring an included angle $\theta_p$ between a longitudinal direction of a signal wave emanating from the wireless communication terminal 200 and a longitudinal direction of the antenna 70 at the point 63 (see FIG. 2).

The distance measuring unit 20 is configured for measuring a distance between the wireless communication terminal 200 and the point 63. The distance measuring unit 20 measures the distance using the following formula: $E=3.69 \times TA \times C/2$, where E is designated as the distance, TA is designated as the timing advance value of the wireless communication terminal 200 at a location P, and C is designated as speed of light. The timing advance value is the length of time a signal takes to reach the base station from the communication device. This value is normally between 0 and 63.

The time measuring unit 40 is configured for measuring the time the wireless communication terminal 200 takes to move from a first location A to a second location B.

The speed calculator 30 is configured for calculating the speed of the wireless communication terminal 200 moving from the first location A to the second location B using the following formula:

$$V = \frac{\sqrt{E_a^2 + E_b^2 - 2E_a E_b \cos(\theta_b - \theta_a)}}{t},$$

where V is designated as the speed, $E_a$ is designated as the distance between the wireless communication terminal 200 at the first location A and the point 63, $E_b$ is designated as the distance between the wireless communication terminal 200 at the second location B and the point 63, $\theta_a$ is designated as the included angle between a longitudinal direction of the signal wave emanating from the wireless communication terminal 200 at the first location A and the longitudinal direction of the antenna 70 at the point 63, $\theta_b$ is designated as the included angle between the longitudinal direction of the signal wave emanating from the wireless communication terminal 200 at the second location B and the longitudinal direction of the antenna 70 at the point 63, and t is designated as the time the wireless communication terminal 200 takes to move from the first location A to the second location B.

The informing unit 50 is configured for informing the calculated speed. The calculated speed is an average speed of the moving object between the first location A and the second location B. In this embodiment, the informing unit 50 includes a display unit 52 for displaying the calculated speed and a speaker 54 for informing a user by sound.

The speed measuring system 100 can measure the speed of the wireless communication terminal 200 without an additional GPS chip. Therefore, the cost for manufacturing such a wireless communication terminal 200 is reduced.

Various components of the speed measuring system 100 such as the speed calculator 30, the time measuring unit 40, the distance measuring unit 20, the informing unit 50 can be individual electrical elements, or alternatively integrated into a central control unit in the wireless communication terminal 200. The components can be connected to each other using an input/output (I/O) bus. Also, some units can be software modules written in a variety of computer languages such as C#, Visual C++, Visual BASIC, C++, and so on.

Figure 3:
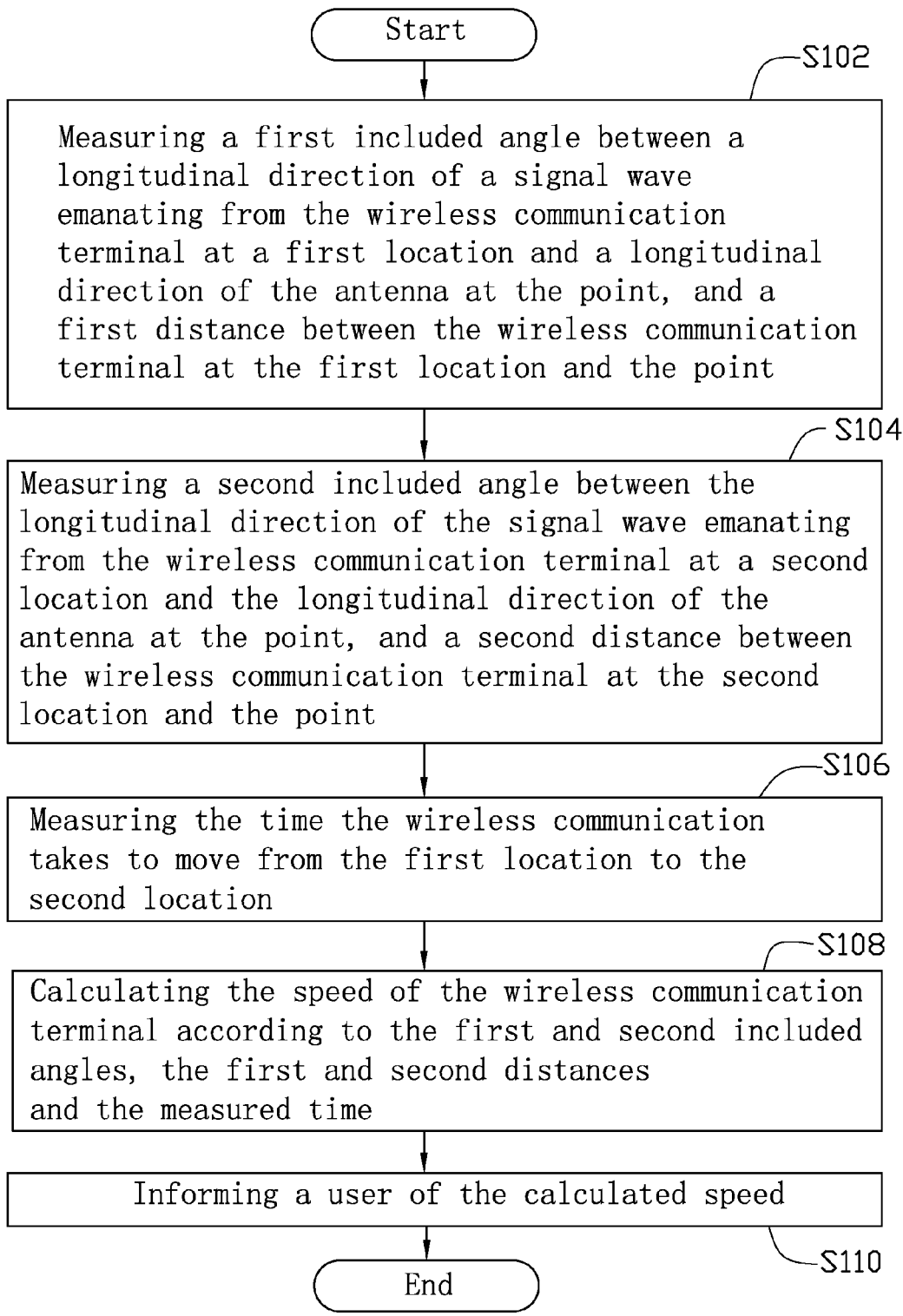
FIG. 3 is a flowchart of a speed measuring method of the speed measuring system, according to another exemplary embodiment.

Referring to FIG. 3, a speed measuring method for measuring a speed that the wireless communication terminal 200 is moving includes steps S102 through S110. Step S102: measuring a first included angle between a longitudinal direction of a signal wave emanating from the wireless communication terminal at a first location and a longitudinal direction of the antenna 70 at the point 63 (see FIG. 2), and a first distance between the wireless communication terminal 200 at the first location and the point 63. Step S104: measuring a second included angle between a longitudinal direction of the signal wave emanating from the wireless communication terminal at a second location and a longitudinal direction of the antenna at the point 63, and a second distance between the wireless communication terminal 200 at the second location and the point 63. Step S106: measuring the time the wireless communication 200 takes to move from the first location to the second location. Step S108: calculating the speed of the wireless communication terminal 200 according to the first and second included angles, the first and second distances, and the measured time. Step S110: informing a user of the calculated speed.

The above steps 102 through 110 can be carried out by the speed measuring system 100.

It is to be understood, however, that even though numerous characteristics and advantages of the present embodiment have been set forth in the foregoing description, together with details of the structure and function of the embodiment, the embodiment is illustrative only, and changes may be made in detail, especially in matters of shape, size, and arrangement of parts within the principles of the embodiment to the full extent indicated by the broad general meaning of the terms in which the appended claims are expressed.

What is claimed is:

1. A speed measuring system for measuring the speed of a wireless communication terminal communicating with a base station, the base station comprising a signal tower, an antenna configured in a horizontal plane on the signal tower, the signal tower defining a central longitudinal axis perpendicular to the antenna, and the axis intersecting the antenna at a point, the system comprising:

an angle measuring unit configured for measuring a first included angle between a longitudinal direction of a signal wave emanating from a first location of the wireless communication terminal and a longitudinal direction of the antenna at the point, and a second included angle between a longitudinal direction of a signal wave emanating from a second location of the wireless communication terminal and the longitudinal direction of the antenna at the point;

a distance measuring unit configured for measuring a first distance between the wireless communication terminal at the first location and the point and a second distance between the wireless communication terminal at the second location and the point;

a time measuring unit configured for measuring the time the wireless communication terminal takes to move from the first location to the second location; and a speed calculator configured for calculating the speed of the wireless communication terminal moving from the first location to the second location using the following formula:

$$V = \frac{\sqrt{E_a^2 + E_b^2 - 2E_a E_b \cos(\theta_b - \theta_a)}}{t},$$

where V is designated as the speed, $E_a$ is designated as the first distance, $E_b$ is designated as the second distance, $\theta_a$ is designated as the first included angle, $\theta_b$ is designated as the second included angle, and t is designated as the time the wireless communication terminal takes to move from the first location to the second location.

2. The system as claimed in claim 1, wherein the distance measuring unit measures the first and second distances using the following formula: E=3.69×TA×C/2, where E is designated as the respective first or second distance, TA is designated as the timing advance value at the respective first or second location, and C is designated as the speed of light.

3. The system as claimed in claim 1, further comprising an informing unit configured for informing the calculated speed.

4. The system as claimed in claim 3, wherein the distance measuring unit, the speed calculator, the time measuring unit and the informing unit are installed on the wireless communication terminal.

5. The system as claimed in claim 1, wherein the angle measuring unit is installed on the base station.

6. The system as claimed in claim 1, wherein the wireless communication terminal is a cellular phone.

7. The system as claimed in claim 1, wherein the base station is a global-system-for-mobile communication base station.

8. The system as claimed in claim 3, wherein the informing unit comprises a display unit for displaying the calculated speed.

9. The system as claimed in claim 3, wherein the informing unit comprises a speaker for informing a user by sound.

10. A speed measuring method for measuring the speed of a wireless communication terminal communicating with a base station using the speed measuring system of claim 1, the base station comprising a signal tower, and an antenna configured in a horizontal plane on the signal tower, the signal tower defining a central longitudinal axis perpendicular to the antenna, and the axis intersecting the antenna at a point, the method comprising:

measuring a first included angle between a longitudinal direction of a signal wave emanating from the wireless communication terminal at a first location and a longitudinal direction of the antenna at the point using the angle measuring unit, and a first distance between the wireless communication terminal at the first location and the point using the distance measuring unit;

measuring a second included angle between the longitudinal direction of the signal wave emanating from the wireless communication terminal at a second location and the longitudinal direction of the antenna at the point using the angle measuring unit, and a second distance between the wireless communication terminal at the second location and the point using the distance measuring unit;

measuring the time the wireless communication terminal takes to move from the first location to the second location using the time measuring unit; and calculating the speed of the wireless communication terminal according to the first and second included angles, the first and second distances and the measured time.

11. The method as claimed in claim 10, wherein the first and second distances are measured using the following formula: E=3.69×TA×C/2, where E is designated as the respective first or second distance, TA is designated as the timing advance value at the respective first or second location, and C is designated as the speed of light.

12. The method as claimed in claim 10, wherein the speed is calculated using the following formula:

$$V = \frac{\sqrt{E_a^2 + E_b^2 - 2E_a E_b \cos(\theta_b - \theta_a)}}{t},$$

where V is designated as the speed, $E_a$ is designated as the first distance between the wireless communication terminal at the first location and the point, $E_b$ is designated as the second distance between the wireless communication terminal at the second location and the point, $\theta_a$ is designated as the first included angle between the signal wave from the wireless communication terminal at the first location to the point and the antenna, $\theta_b$ is designated as the second included angle between the signal wave from the wireless communication terminal at the second location to the point and the antenna, and t is designated as the time the wireless communication terminal takes to move from the first location to the second location.

13. The method as claimed in claim 10, wherein the speed measuring system further comprises an informing unit, and the method further comprises: informing the calculated speed using the informing unit.

\* \* \* \* \*